United States Patent
Kanda et al.

(10) Patent No.: US 10,357,838 B2
(45) Date of Patent: Jul. 23, 2019

(54) GRAPHITE-COPPER COMPOSITE ELECTRODE MATERIAL AND ELECTRICAL DISCHARGE MACHINING ELECTRODE USING THE MATERIAL

(71) Applicant: TOYO TANSO CO., LTD., Osaka-shi, Osaka (JP)

(72) Inventors: Masao Kanda, Kanonji (JP); Naoto Ohta, Osaka (JP); Kiyoshi Saito, Kanonji (JP); Masaki Okada, Kanonji (JP); Motoki Onishi, Osaka (JP); Takeyuki Namiki, Osaka (JP)

(73) Assignee: TOYO TANSO CO., LTD., Osaka-shi (JP)

( * ) Notice: Subject to any disclaimer, the term of this patent is extended or adjusted under 35 U.S.C. 154(b) by 102 days.

(21) Appl. No.: 15/304,101

(22) PCT Filed: Apr. 1, 2015

(86) PCT No.: PCT/JP2015/060308
§ 371 (c)(1),
(2) Date: Oct. 14, 2016

(87) PCT Pub. No.: WO2015/159709
PCT Pub. Date: Oct. 22, 2015

(65) Prior Publication Data
US 2017/0043423 A1 Feb. 16, 2017

(30) Foreign Application Priority Data

Apr. 15, 2014 (JP) .................................. 2014-083661
Oct. 15, 2014 (JP) .................................. 2014-211060

(51) Int. Cl.
*B23H 1/06* (2006.01)
*C04B 41/88* (2006.01)
(Continued)

(52) U.S. Cl.
CPC ............... *B23H 1/06* (2013.01); *B23H 9/006* (2013.01); *C04B 41/009* (2013.01);
(Continued)

(58) Field of Classification Search
CPC ....... C04B 41/45; C04B 41/52; C04B 35/522; C04B 35/536; H01M 4/583; B23H 1/06
(Continued)

(56) References Cited

U.S. PATENT DOCUMENTS 3,619,286 A 11/1971 Gutnajer
5,889,220 A 3/1999 Akiyoshi et al.
(Continued)

FOREIGN PATENT DOCUMENTS

EP 1 055 650 A1 11/2000
GB 959834 A 6/1964
(Continued)

OTHER PUBLICATIONS

International Search Report dated Jun. 23, 2015 issued in counterpart application No. PCT/JP2015/060308 (2 pages).
(Continued)

*Primary Examiner* — Khanh T Nguyen
(74) *Attorney, Agent, or Firm* — Westerman, Hattori, Daniels & Adrian, LLP

(57) ABSTRACT

An object is to provide a graphite-copper composite electrode material that is capable of reducing electrode wear to a practically usable level and to provide an electrical discharge machining electrode using the material. A graphite-copper composite electrode material includes a substrate comprising a graphite material and having pores, and copper impregnated in the pores of the substrate, the electrode material having an electrical resistivity of 2.5 μΩm or less, preferably 1.5 μΩm or less, more preferably 1.0 μΩm or less. It is desirable that the substrate comprising the graphite
(Continued)

material have an anisotropy ratio of 1.2 or less. It is desirable that an impregnation rate φ of the copper in the electrode material is 13% or greater. It is desirable that the substrate comprising the graphite material have a bulk density of from 1.40 $Mg/m^3$ to 1.85 $Mg/m^3$.

20 Claims, 5 Drawing Sheets

(51) Int. Cl.
 *C04B 41/00* (2006.01)
 *C04B 41/51* (2006.01)
 *B23H 9/00* (2006.01)
 *C04B 41/53* (2006.01)
 *C04B 35/52* (2006.01)
 *C04B 111/00* (2006.01)
 *C04B 111/94* (2006.01)

(52) U.S. Cl.
 CPC ...... *C04B 41/5127* (2013.01); *C04B 41/5384* (2013.01); *C04B 41/88* (2013.01); *C04B 2111/00844* (2013.01); *C04B 2111/94* (2013.01)

(58) Field of Classification Search
 USPC .......................................... 428/408
 See application file for complete search history.

(56) References Cited

U.S. PATENT DOCUMENTS

2004/0241447 A1* 12/2004 Fukushima ........... C04B 41/009
 428/408

2008/0038535 A1 2/2008 Fukushima

FOREIGN PATENT DOCUMENTS

| JP | S58114820 | * | 7/1983 | ............... B23H 1/04 |
|----|-----------|---|--------|---------|
| JP | 7-9264 A | | 1/1995 | |
| JP | 7-32216 A | | 2/1995 | |
| JP | 8-199280 A | | 8/1996 | |
| JP | 9-175877 A | | 7/1997 | |
| JP | 2000-263497 A | | 9/2000 | |
| JP | 2004-2096 A | | 1/2004 | |
| JP | 2004-209610 A | | 7/2004 | |
| JP | 2008-240155 A | | 10/2008 | |

OTHER PUBLICATIONS

Sidhu, S.S. et al, "Study of Surface Properties in Particulate-Reinforced Metal Matrix Composites (MMCs) Using Powder-Mixed Electrical Discharge Machining (EDM)", Materials and Manufacturing Processes, Jan. 1, 2014, vol. 29, No. 1, pp. 46-52; cited in EESR.

Muttamara, A. et al, "Effect of Electrode Material on Electrical Discharge Machining of Alumina", Journal of Materials Processing Technology, Elsevier, Mar. 1, 2009, vol. 209, No. 5, pp. 2545-2552; cited in EESR.

Shin, A. et al, "Near-Dry EDM Milling of Mirror-Like Surface Finish", International Journal of Electrical Machining, Jan. 1, 2007, No. 13; retrieved from the Internet; cited in EESR. (6 pages).

Extended (supplementary) European Search Report dated Nov. 27, 2017, issued in counterpart European Application No. 15779903.2. (10 pages).

* cited by examiner

GRAPHITE-COPPER COMPOSITE ELECTRODE MATERIAL AND ELECTRICAL DISCHARGE MACHINING ELECTRODE USING THE MATERIAL

TECHNICAL FIELD

The present invention relates to a graphite-copper composite electrode material and an electrical discharge machining electrode using the material.

BACKGROUND ART

Conventionally, materials such as copper, graphite, which is a carbon material, tungsten-copper, tungsten-silver, and graphite-copper are used as electrode materials for electrical discharge machining. Among them, tungsten-copper, tungsten-silver, and graphite-copper materials are particularly suitable for use in electric discharge machining of difficult-to-machine materials with a high-melting point, such as cemented carbide.

Each of these materials has the characteristics as a material suitable for electrical discharge machining. However, copper has a low melting point, so it is not suitable for use in electrical discharge machining of a cemented carbide material, which has a high-melting point. The tungsten-copper and tungsten-silver materials themselves have a high-melting point, so they are capable of electrical discharge machining of cemented carbide material, which has a high-melting point and is a difficult-to-machine material, or the like, with low electrode wear. However, these materials have poor machine processability into an electrode shape, and another drawback of these materials is that the material cost and the manufacturing cost are significantly higher than those of graphite-based materials. Graphite alone and a graphite-copper material are less expensive than tungsten-copper and tungsten-silver materials, and they are also excellent in machine processability. A problem with these materials, however, is high electrode wear.

For the purpose of improving machine processability of the tungsten-copper electrode, a method of producing a discharge electrode by infiltrating copper into tungsten powder using a metal infiltration method is disclosed (Patent Literature 1). With the just-mentioned manufacturing method, however, it is difficult to change the ratio of tungsten and copper because of the constraint on the manufacturing method. Therefore, it cannot solve the above-mentioned problem with the material made of tungsten-copper.

On the other hand, a method of manufacturing a copper-tungsten alloy by sintering is disclosed (Patent Literature 2). The just-mentioned manufacturing method, however, has the following problems. It is difficult to obtain a material with a uniform composition in the case that the electrode size is large. Moreover, addition of an additive for improving formability may rather degrade the discharge characteristics.

On the other hand, it is believed that the reason for high electrode wear with the graphite-copper material is that when the graphite-copper material is used as the electrode, heat is likely to accumulate and arc tends to occur easily. In order to improve the problem, a method of melt-infiltrating aluminum containing silicon into a graphite material is disclosed (Patent Literature 3).

CITATION LIST

Patent Literature

[Patent Literature 1] Japanese Published Unexamined Patent Application No. H07(1995)-9264
[Patent Literature 2] Japanese Published Unexamined Patent Application No. H08(1996)-199280
[Patent Literature 3] Japanese Published Unexamined Patent Application No. 2004-209610

SUMMARY OF INVENTION

Technical Problem

However, even with the electrical discharge machining electrode disclosed in Patent Literature 3, there remains a problem that the electrode wear cannot be reduced to a practically usable level.

In view of the problem, it is an object of the present invention to provide a graphite-copper composite electrode material that is capable of reducing electrode wear to a practically usable level and to provide an electrical discharge machining electrode using the material.

Solution to Problem

In order to accomplish the foregoing object, the present invention provides a graphite-copper composite electrode material comprising a substrate comprising a graphite material and having pores, and copper impregnated in the pores of the substrate, characterized by having an electrical resistivity of 2.5 $\mu\Omega$m or less.

Advantageous Effects of Invention

The present invention achieves a significant advantageous effect of making it possible to reduce electrode wear to a practically usable level.

DESCRIPTION OF EMBODIMENTS

Figure 1:
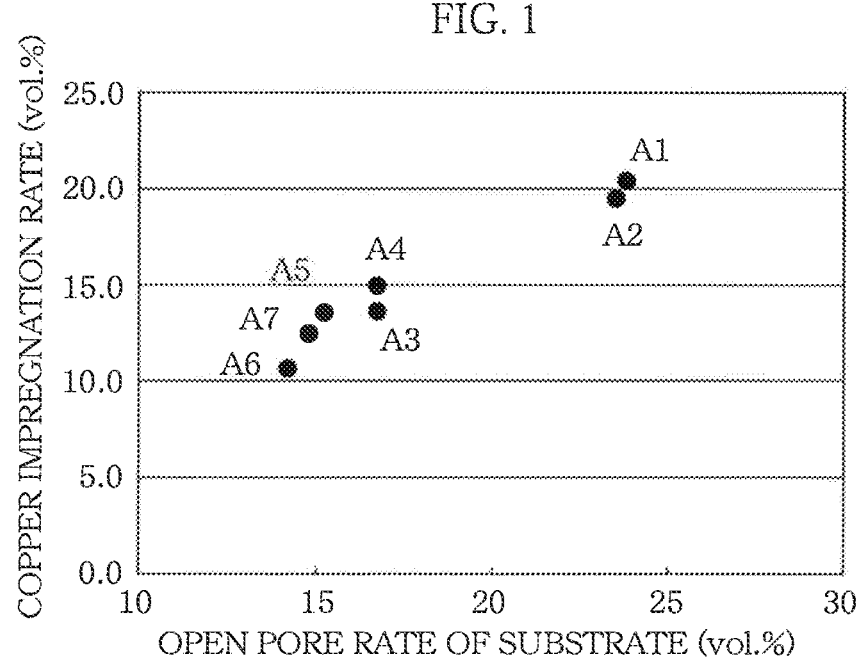
FIG. 1 is a graph illustrating the relationship between open pore rate of the substrate and copper impregnation rate for materials A1 to A7.

The present inventors conducted assiduous studies about graphite-copper material, which is less costly than copper-tungsten and silver-tungsten materials, to solve the above-described problems in the prior art on a practical level and to obtain a copper impregnated graphite material that is dense and light in weight and keeps the electrode wear to a practically usable level. As a result, the present inventors discovered that when copper is impregnated into a graphite material, which is a high-temperature material, that is uniform in quality and has an appropriate porosity, the electrical resistivity of the electrode becomes 2.5 µΩm or less (preferably 1.5 µΩm or less, more preferably 1.0 µΩm or less), whereby electrode wear can be remarkably reduced. Thus, the present invention has been accomplished.

The present invention provides a graphite-copper composite electrode material comprising a substrate made of a graphite material and having pores, and copper impregnated in the pores of the substrate, the electrode material being characterized by having an electrical resistivity of 2.5 µΩm or less.

When using the graphite-copper composite electrode material having an electrical resistivity of 2.5 µΩm or less, the electrode wear rate of the graphite-copper composite electrode is reduced in electrical discharge machining of cemented carbide. Moreover, it becomes possible to process the material into an electrode shape more easily and to produce the electrode less costly than when using tungsten-copper or tungsten-silver as the electrode.

It is desirable that the electrical resistivity be 1.5 µΩm or less. It is particularly desirable that the electrical resistivity be 1.0 µΩm or less.

Such conditions make it possible to obtain the above-described advantageous effects more significantly.

It is desirable that the substrate comprising the graphite material have an anisotropy ratio of 1.2 or less.

A graphite material having an anisotropy ratio of 1.2 or less, which is highly isotropic, (hereinafter such a material may also be referred to as "isotropic graphite material") is easy to design and use because such a material shows small characteristic difference depending on the cut-out direction. Moreover, because such a material shows excellent machine processability, precise machining can be made easily. Taking these matters into consideration, it is more desirable that the anisotropy ratio be 1.1 or less. It should be noted that the phrase "a graphite material has an anisotropy ratio of 1.2 or less" means that the mean value of the ratios of electrical resistivity measured in any two directions perpendicular to each other of the graphite material is 1.2 or less.

The isotropic graphite material generally includes a material substantially consisting of carbon and a material composed of carbon as its main component that are made by kneading an aggregate of coke with a binder such as pitch added thereto, thereafter performing cold isotropic pressure forming, and performing baking and graphitization, and, if necessary, performing pitch impregnation, re-baking, resin impregnation, refining, and the like. The isotropic graphite material also includes what is called graphitized products, including pitch-impregnated products and resin-impregnated products.

It is desirable that the impregnation rate φ of the copper in the electrode material that is obtained by the following equation (1) be 13% or greater.

$$\varphi = [(d_B - d_{B,s})/\rho_{Cu}] \times 100, \quad (1)$$

In the equation (1), $d_B$ is a bulk density of the electrode, $d_{B,s}$ is a bulk density of the substrate comprising the graphite material, and $\rho_{Cu}$ is the specific gravity of copper ($\rho_{Cu}$=8.96 Mg/m³).

When the copper impregnation rate φ becomes higher, the electrode resistance value becomes lower. The electrode resistance value and the electrode wear rate are in such a relationship that when the electrode resistance value becomes lower, the electrode wear rate accordingly becomes lower. Therefore, by setting the copper impregnation rate φ to 13% or greater, the electrode resistance value can be decreased. As a result, the electrode wear rate can be remarkably reduced. Taking these matters into consideration, it is more desirable that the impregnation rate φ of the copper in the electrode material be 15% or greater.

It is desirable that the variable x obtained by the following equation (2) be 7.5 or less, in particular, 6.5 or less.

$$x = (d_B \times \varphi \times \rho / \sigma_B) \times 10 \quad (2)$$

In the above equation (2), $d_B$ is the bulk density (Mg/m³) of the electrode, φ is the copper impregnation rate (%), ρ is the electrical resistivity (µΩm), and $\sigma_B$ is the flexural strength (MPa).

For the electrical discharge machining electrode, both low electrode wear rate and high processing speed are required. In many cases, the required product quality characteristics are achieved as conflicting characteristics. However, the present inventors have discovered that it is possible to enable the material to achieve well-balanced performance by keeping the variable x, which is obtained by the characteristic values, to a small value. Taking these matters into consideration, it is more desirable that the value of the variable x be 5.0 or less.

It is desirable that the substrate comprising the graphite material have a bulk density of from 1.40 Mg/m³ to 1.85 Mg/m³.

If the bulk density of the substrate comprising the graphite material is less than 1.40 Mg/m³, the strength of the substrate may become lower. On the other hand, if the bulk density exceeds 1.85 Mg/m³, the open pore rate of the substrate becomes lower, so the copper impregnation rate becomes lower. Taking these matters into consideration, it is more desirable that the substrate comprising the graphite material have a bulk density of from 1.60 Mg/m³ to 1.80 Mg/m³.

It is desirable that the substrate comprising the graphite material have an open pore rate of 14 vol % or higher.

If the open pore rate of the substrate is less than 14 vol %, copper is difficult to be impregnated in the substrate, so the electrical resistivity may not be lowered sufficiently or the electrode wear rate may be made higher.

It is desirable that the substrate comprising the graphite material have an electrical resistivity of from 8.9 µΩm to 19.5 µΩm.

If the substrate has an electrical resistivity of less than 8.9 µΩm, it means a high degree of graphitization, so the strength of the graphite substrate itself becomes lower. As a consequence, the electrode wear rate during electrical discharge machining may become higher. On the other hand, if the substrate has an electrical resistivity of higher than 19.5 µΩm, it means a low degree of graphitization, so the strength of the graphite substrate itself becomes too high. As a result, the formation of the electrode may be difficult by machine processing such as cutting.

The electrical resistivity of the substrate should more preferably be 10.0 μΩm or higher, and still more preferably be 11.0 μΩm or higher.

It is desirable that the impregnation of copper be performed by hot isostatic pressing (HIP).

The just-mentioned method enables to apply pressure uniformly onto every face of the isotropic graphite material substrate and thereby inhibits the isotropic graphite material substrate from deforming during the impregnation of copper.

It should be noted, however, that the impregnation of copper may not necessarily be performed by hot isostatic pressing but may be carried out by liquid melt forging or the like.

The invention also provides an electrical discharge machining electrode for use in die-sinking a cemented carbide comprising tungsten carbide as a main component by electrical discharge machining, the electrical discharge machining electrode characterized by comprising one of the above-described graphite-copper composite electrode materials.

OTHER EMBODIMENTS (1) In the copper impregnation by HIP, it is also possible to add an impregnation enhancing agent for improving the wettability at the interface between graphite and copper as long as the addition of the impregnation enhancing agent does not adversely affect the characteristics. Examples of such an agent include titanium, zirconium, scandium, yttrium, lanthanum, hafnium, and chemical compounds thereof. However, the type of impregnation enhancing agent is not limited to these examples.

In this case, it is preferable that the amount of the impregnation enhancing agent be from 0.5 to 10 weight %. If the amount is less than 0.5 weight %, the improvement of wettability may not be sufficient. If the amount exceeds 10 weight %, it may be difficult to separate the remaining copper alloy and the copper impregnated graphite material from each other after the impregnation.

(2) The copper impregnation is carried out, for example, using a pressure resistant container. A copper alloy and the isotropic graphite material are placed respectively in a ceramic container (crucible), such as one made of carbon, and another ceramic container (saggar), such as one made of carbon, and the crucible and the saggar are inserted in the pressure resistant container. Subsequently, the inside of the container is heated to a temperature higher than the melting point of the copper alloy to be impregnated, to thereby perform pressure impregnation. The pressure is from about several to about 150 MPa, and the duration of the impregnation is from about 1 to about 60 minutes, preferably from about 30 to 60 minutes.

As for the composition of the copper alloy to be used in the present invention, the copper alloy may contain inevitable impurities as long as the impurities do not adversely affect the electrical discharge machining characteristics.

(3) When the electrical discharge machining electrode has a higher copper impregnation rate, the electrical discharge machining electrode has a lower electrical resistivity because copper has high electrical conductivity, and at the same time, the electrical discharge machining electrode has a higher bulk density because copper has high density. For this reason, in order to reduce the electrical resistivity of the electrical discharge machining electrode, the copper impregnation rate needs to be increased to a certain level. Taking these matters into consideration, it is desirable that the lower limit of the bulk density of the electrical discharge machining electrode be 2.5 Mg/m$^3$ or higher, more desirably 3.0 Mg/m$^3$ or higher. Although the bulk density of the electrical discharge machining electrode becomes higher when the copper impregnation rate of the electrical discharge machining electrode is higher, an excessively high bulk density may cause adverse effects on other characteristics. Moreover, there is a limit on the amount of copper that can be impregnated in the pores of the graphite material. Taking these matters into consideration, it is desirable that the upper limit of the bulk density of the electrical discharge machining electrode be 4.5 Mg/m$^3$ or lower, more desirably 4.0 Mg/m$^4$ or lower.

It is also desirable that the lower limit of the copper impregnation rate be 12.5% or higher, more desirably 15% or higher, and that the upper limit thereof be 35% or lower, more desirably 30% or lower, for the same reason as discussed above.

Generally, it is preferable that the electrical discharge machining electrode has as low an electrical resistivity as possible. However, because an electrical resistivity that is excessively close to zero can adversely affect other characteristics, it is desirable that the lower limit of the electrical resistivity be 0.01 μΩm or higher, particularly desirably 0.1 μΩm or higher. In addition, it is preferable that the flexural strength be higher because the electrode wear during discharge is reduced. Therefore, it is desirable that the flexural strength be 40 MPa or higher, particularly desirably 60 MPa or higher. Nevertheless, an excessively high flexural strength may adversely affect other characteristics. For this reason, it is desirable that the flexural strength be equal to or lower than 220 MPa, particularly desirably equal to or lower than 200 MPa.

EXAMPLES

Hereinbelow, examples of the present invention will be described in detail. However, the present invention is not limited to these examples.

Example 1

A dense isotropic graphite material (bulk density 1.66 Mg/m$^3$, open pore rate 23.8%, electrical resistivity 11.1 μΩm, anisotropy ratio 1.02, made by Toyo Tanso Co., Ltd) was accommodated in a pressure resistant container, and copper melted at 1070° C. was pressure impregnated in the graphite material with $N_2$ gas at a pressure of 15 MPa for 1 hour, to prepare a copper impregnated graphite material.

The copper impregnated graphite material prepared in this manner is hereinafter referred to as a material A1.

An electrical discharge machining electrode processed from the just-described copper impregnated graphite material may be hereinafter referred to as an electrode A1. This also applies to the following Examples 2 through 9 and Comparative Examples 1 and 2. (For example, an electrical discharge machining electrode of Example 2 may be referred to as an electrode A2.)

Example 2

A copper impregnated graphite material was prepared in the same manner as described in Example 1 above, except for using an isotropic graphite material having a bulk density of 1.66 Mg/m$^3$, an open pore rate of 23.5%, an electrical resistivity of 14.0 μΩm, and an anisotropy ratio of 1.03, as the isotropic graphite material.

The copper impregnated graphite material prepared in this manner is hereinafter referred to as a material A2.

Example 3

A copper impregnated graphite material was prepared in the same manner as described in Example 1 above, except for using an isotropic graphite material having a bulk density of 1.79 Mg/m$^3$, an open pore rate of 16.7%, an electrical resistivity of 12.6 μΩm, and an anisotropy ratio of 1.05, as the isotropic graphite material.

The copper impregnated graphite material prepared in this manner is hereinafter referred to as a material A3.

Example 4

A copper impregnated graphite material was prepared in the same manner as described in Example 1 above, except for using an isotropic graphite material having a bulk density of 1.77 Mg/m$^3$, an open pore rate of 16.7%, an electrical resistivity of 18.9 μΩm, and an anisotropy ratio of 1.06, as the isotropic graphite material.

The copper impregnated graphite material prepared in this manner is hereinafter referred to as a material A4.

Example 5

A copper impregnated graphite material was prepared in the same manner as described in Example 1 above, except for using an isotropic graphite material having a bulk density of 1.78 Mg/m$^3$, an open pore rate of 15.2%, an electrical resistivity of 19.1 μΩm, and an anisotropy ratio of 1.03, as the isotropic graphite material.

The copper impregnated graphite material prepared in this manner is hereinafter referred to as a material A5.

Example 6

A copper impregnated graphite material was prepared in the same manner as described in Example 1 above, except for using an isotropic graphite material having a bulk density of 1.81 Mg/m$^3$, an open pore rate of 14.2%, an electrical resistivity of 8.9 μΩm, and an anisotropy ratio of 1.03, as the isotropic graphite material.

The copper impregnated graphite material prepared in this manner is hereinafter referred to as a material A6.

Example 7

A copper impregnated graphite material was prepared in the same manner as described in Example 1 above, except for using an isotropic graphite material having a bulk density of 1.80 Mg/m$^3$, an open pore rate of 14.8%, an electrical resistivity of 15.2 μΩm, and an anisotropy ratio of 1.06, as the isotropic graphite material.

The copper impregnated graphite material prepared in this manner is hereinafter referred to as a material A7.

Example 8

A copper impregnated graphite material was prepared in the same manner as described in Example 1 above, except for using an isotropic graphite material having a bulk density of 1.78 Mg/m$^3$, an open pore rate of 15.0%, an electrical resistivity of 15.9 μΩm, and an anisotropy ratio of 1.05, as the isotropic graphite material.

The copper impregnated graphite material prepared in this manner is hereinafter referred to as a material A8.

Example 9

A copper impregnated graphite material was prepared in the same manner as described in Example 1 above, except for using an isotropic graphite material having a bulk density of 1.78 Mg/m$^3$, an open pore rate of 16.1%, an electrical resistivity of 14.4 μΩm, and an anisotropy ratio of 1.04, as the isotropic graphite material.

The copper impregnated graphite material prepared in this manner is hereinafter referred to as a material A9.

Comparative Example 1

A copper impregnated graphite material was prepared in the same manner as described in Example 1 above, except for using an isotropic graphite material having a bulk density of 1.88 Mg/m$^3$, an open pore rate of 10.7%, an electrical resistivity of 8.7 μΩm, and an anisotropy ratio of 1.03, as the isotropic graphite material.

The copper impregnated graphite material prepared in this manner is hereinafter referred to as a material Z1.

Comparative Example 2

A copper impregnated graphite material was prepared in the same manner as described in Example 1 above, except for using an isotropic graphite material having a bulk density of 1.92 Mg/m$^3$, an open pore rate of 13.4%, an electrical resistivity of 20.0 μΩm, and an anisotropy ratio of 1.06, as the isotropic graphite material.

The copper impregnated graphite material prepared in this manner is hereinafter referred to as a material Z2.

Experiment 1

Figure 2:
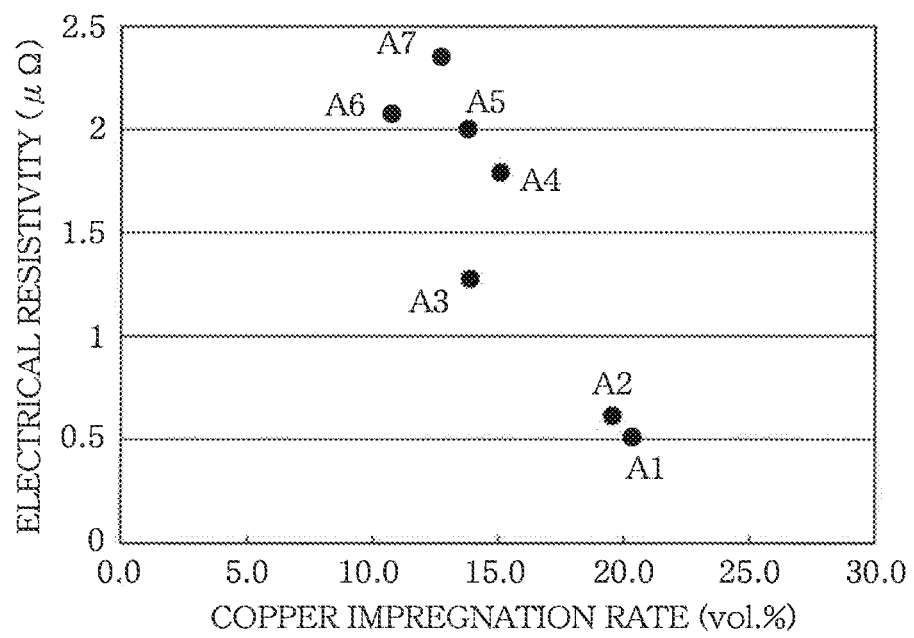
FIG. 2 is a graph illustrating the relationship between copper impregnation rate and electrical resistivity for materials A1 to A7.
Figure 3:
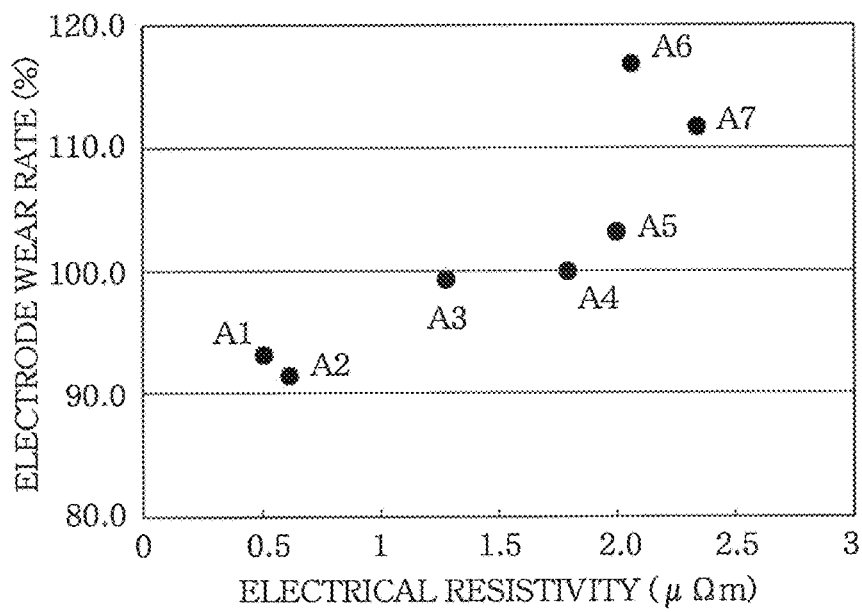
FIG. 3 is a graph illustrating the relationship between electrical resistivity and electrode wear rate for materials A1 to A7.

The electrical resistivity, the copper impregnation rate, and the electrode wear rate (lengthwise electrode wear rate) for the above-described materials (electrodes) A1 to A7 were determined in the following manner. The results are shown in Table 1. In addition, the relationship between open pore rate of the substrate and copper impregnation rate for the materials A1 to A7 is shown in FIG. 1, the relationship between copper impregnation rate and electrical resistivity for the materials A1 to A7 is shown in FIG. 2, and the relationship between electrical resistivity and electrode wear rate for the materials A1 to A7 is shown in FIG. 3.

[Measurement of Electrical Resistivity]

The electrical resistivity of each of the materials was measured using a direct current four terminal sensing method.

[Determination of Copper Impregnation Rate]

The bulk density $d_B$ of each electrode (the bulk density after the copper impregnation) and the bulk density $d_{B,s}$ of each substrate comprising the graphite material were obtained, and the obtained values were assigned into equation (1), to determine the copper impregnation rate. Note that $\rho_{Cu}$ is the specific gravity of copper ($\rho_{Cu}$=8.96 Mg/m³).

$$\varphi=[(d_B-d_{B,s})/\rho_{Cu}]\times100 \quad (1)$$

[Determination of Electrode Wear Rate]

Using the electrodes made of the respective materials, a cemented carbide material (Fujilloy D40, made by Fuji Die Co., Ltd.) was subjected to electrical discharge machining under the following conditions, and the electrode wear length was then measured. The obtained values were assigned into the following equation (3) to determine the electrode wear rate.

Machining area 10×4 mm²
Travel distance of the electrode support jig in a machining depth direction 2 mm
Model: AQ35L made by Sodic Co., Ltd.
Polarity: Straight polarity
Current peak value: 28 (A)
On time: 5 (μsec)
Off time: 10 (μsec)

$$\text{Electrode wear rate}=(\text{electrode wear length [mm]}/\text{machined depth [mm]})\times100 \quad (3)$$

above-mentioned cemented carbide material was machined using the materials (electrodes) A1 to A7, and the machining speed of each of the materials was measured. Note that the term "machining speed" means a machined depth when the cemented carbide material was machined for 1 minute.

As the characteristics of the materials (electrodes) A1 to A7 after the copper impregnation, the bulk density and the flexural strength of each of the electrodes (after the copper impregnation) were determined, in addition to the electrical resistivity and the copper impregnation rate obtained in Experiment 1 above. Then, the variable x of each of the materials (electrodes) A1 to A7 was obtained from the bulk density, the copper impregnation rate, the electrical resistivity, and the flexural strength of the electrodes, using the following equation (2).

$$x=(d_B\times\varphi\times\rho\sigma_B)\times10 \quad (2)$$

TABLE 1

| Material (Electrode) | Characteristics of substrate | | | | Characteristics after copper impregnation | | |
|---|---|---|---|---|---|---|---|
| | Bulk density [Mg/m³] | Electrical resistivity [μΩm] | Open pore rate [Vol %] | Anisotropy ratio | Electrical resistivity [μΩm] | Copper impregnation rate [%] | Electrode wear rate [%] |
| A1 | 1.66 | 11.1 | 23.8 | 1.02 | 0.51 | 20.3 | 93.0 |
| A2 | 1.66 | 14.0 | 23.5 | 1.03 | 0.61 | 19.5 | 91.5 |
| A3 | 1.79 | 12.6 | 16.7 | 1.05 | 1.27 | 13.8 | 99.3 |
| A4 | 1.77 | 18.9 | 16.7 | 1.06 | 1.79 | 15.0 | 100.2 |
| A5 | 1.78 | 19.1 | 15.2 | 1.03 | 1.99 | 13.3 | 103.2 |
| A6 | 1.81 | 8.9 | 14.2 | 1.03 | 2.06 | 10.7 | 116.8 |
| A7 | 1.80 | 15.2 | 14.8 | 1.06 | 2.34 | 12.6 | 111.8 |

As clearly seen from Table 1 and FIG. 1, it is demonstrated that when the open pore rate of the substrate is higher, the copper impregnation rate becomes higher. Moreover, as clearly seen from Table 1 and FIG. 2, it is demonstrated that when the copper impregnation rate is higher, the electrical resistivity becomes lower. Furthermore, as clearly seen from Table 1 and FIG. 3, it is demonstrated that when the electrical resistivity is lower, the electrode wear rate becomes lower.

Experiment 2

Next, under the same conditions as shown in [Determination of Electrode Wear Rate] in Experiment 1 above, the In the above equation (2), $d_B$ is the bulk density (Mg/m³) of the electrode, $\varphi$ is the copper impregnation rate (%), $\rho$ is the electrical resistivity (μΩm), and $\sigma_B$ is the flexural strength (MPa).

The flexural strength was measured by a three-point bending test at room temperature using an Instron-type material testing machine.

Figure 4:
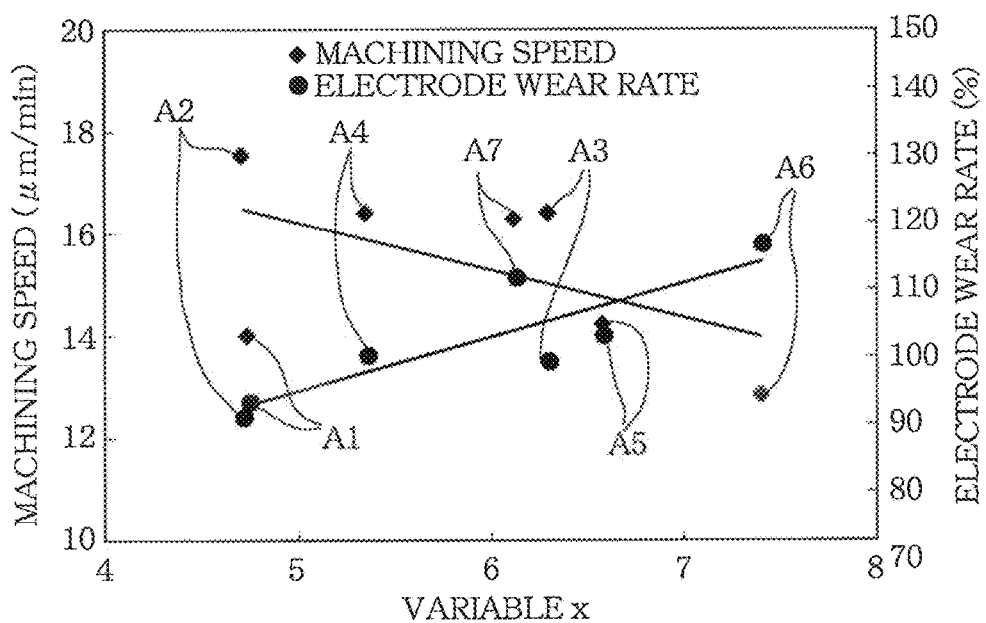
FIG. 4 is a graph illustrating the relationship of variable x with machining speed and electrode wear rate for materials A1 to A7.

The characteristic values are shown in Table 2, and the relationship of variable x with machining speed and electrode wear rate for the materials A1 to A7 is shown in FIG. 4.

TABLE 2

| Material (Electrode) | Characteristics after copper impregnation | | | | | | |
|---|---|---|---|---|---|---|---|
| | Bulk density [Mg/m³] | Electrical resistivity [μΩm] | Flexural strength [MPa] | Copper impregnation rate [%] | Machining speed [μm/min] | Electrode wear rate [%] | Variable x |
| A1 | 3.48 | 0.51 | 76 | 20.3 | 14.0 | 93.0 | 4.73 |
| A2 | 3.41 | 0.61 | 86 | 19.5 | 17.5 | 91.5 | 4.70 |
| A3 | 3.02 | 1.27 | 84 | 13.8 | 16.4 | 99.3 | 6.29 |
| A4 | 3.12 | 1.79 | 157 | 15.0 | 16.4 | 100.2 | 5.35 |
| A5 | 2.97 | 1.99 | 123 | 13.3 | 14.2 | 103.2 | 6.57 |
| A6 | 2.76 | 2.06 | 82 | 10.7 | 12.8 | 116.8 | 7.40 |
| A7 | 2.93 | 2.34 | 141 | 12.6 | 16.3 | 111.8 | 6.12 |

As clearly seen from Table 2 and FIG. 4, the variable x was 7.5 or less for the materials (electrodes) A1 to A7. This indicates that these materials can exhibit excellent performance in both electrode wear rate and machining speed.

Figure 5:
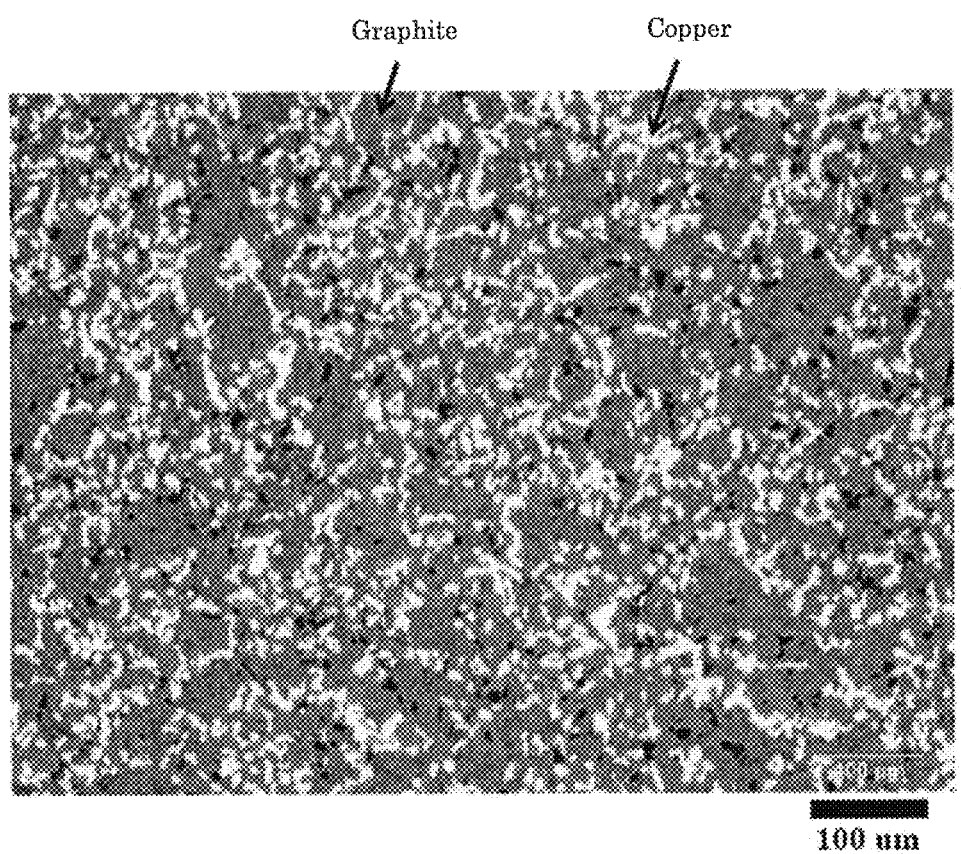
FIG. 5 is a cross-sectional image of the material A1 taken with an optical microscope.

For the material A1, a cross-sectional image was taken with an optical microscope. The image is shown in FIG. 5. In FIG. 5, the white part represents copper, the grey part represents graphite, and the black part represents pores. As shown in FIG. 5, it is observed that copper is impregnated and present uniformly in graphite.

Experiment 3

Figure 6:
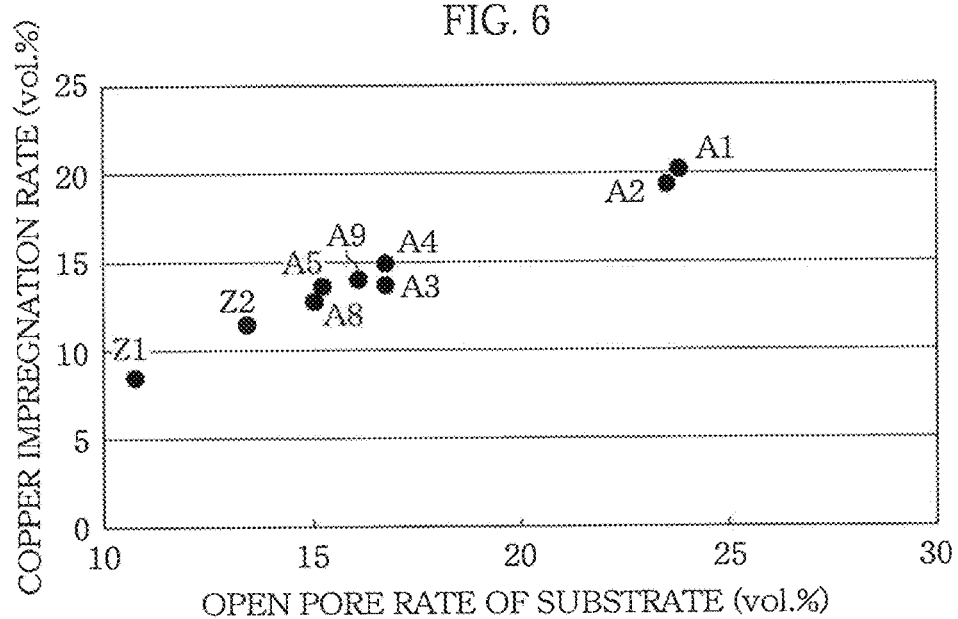
FIG. 6 is a graph showing the relationship between open pore rate of the substrate and copper impregnation rate for materials A1 to A5, A8, A9, Z1, and Z2.
Figure 7:
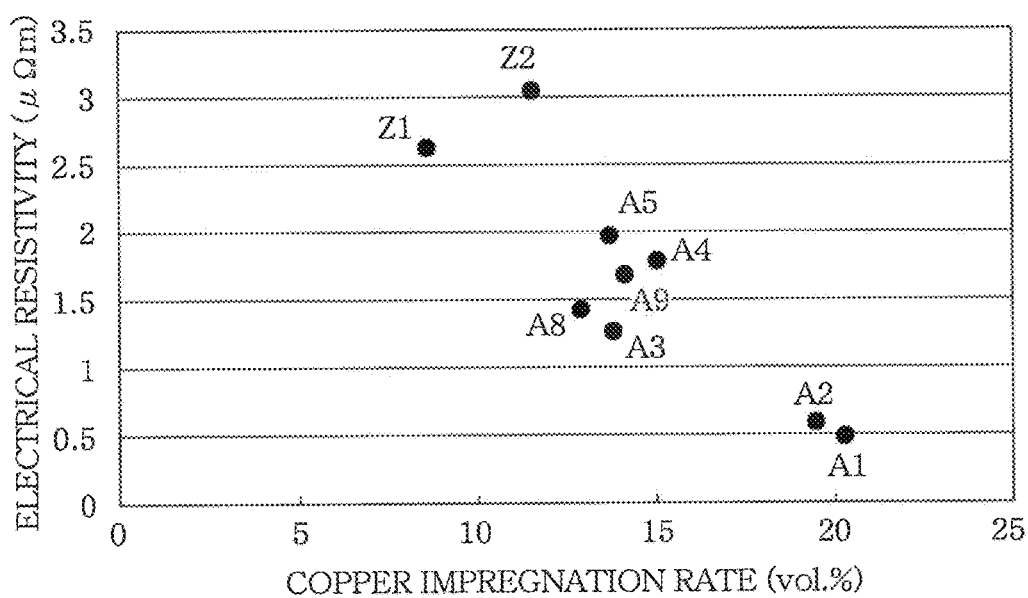
FIG. 7 is a graph illustrating the relationship between copper impregnation rate and electrical resistivity for materials A1 to A5, A8, A9, Z1, and Z2.
Figure 8:
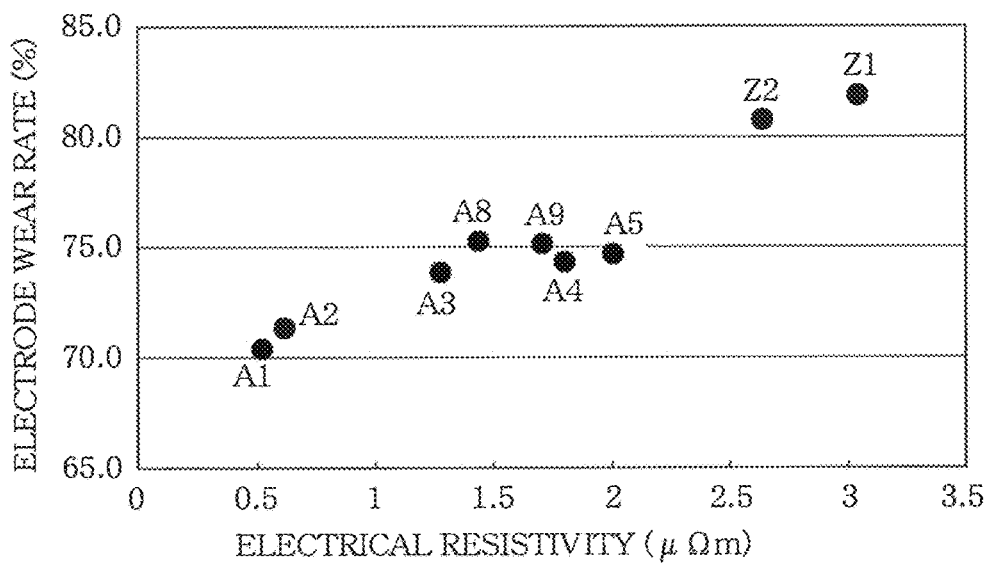
FIG. 8 is a graph illustrating the relationship between electrical resistivity and electrode wear rate for materials A1 to A5, A8, A9, Z1, and Z2.

The electrical resistivity, the copper impregnation rate, and the electrode wear rate (lengthwise electrode wear rate) for the above-described materials (electrodes) A1 to A5, A8, A9, Z1, and Z2 were determined in the same manner as described in Experiment 1. The results are shown in Table 3. Note that only the conditions of electrical discharge machining were changed as set forth below (note that the conditions different from those in Experiment 1 are current peak value, on time, and off time). In addition, the relationship between open pore rate of the substrate and copper impregnation rate for the materials A1 to A5, A8, A9, Z1, and Z2 is shown in FIG. 6, the relationship between copper impregnation rate and electrical resistivity for the materials A1 to A5, A8, A9, Z1, and Z2 is shown in FIG. 7, and the relationship between electrical resistivity and electrode wear rate for the materials A1 to A5, A8, A9, Z1, and Z2 is shown in FIG. 8.

Machining area 10×4 mm$^2$
Travel distance of the electrode support jig in a machining depth direction 2 mm
Model: AQ35L made by Sodic Co., Ltd.
Polarity: Straight polarity
Current peak value: 60 (A)
On time: 30 (μsec)
Off time: 100 (μsec)

higher, the electrical resistivity becomes lower, and that each of the materials A1 to A5, A8, and A9, which has a higher copper impregnation rate than the materials Z1 and Z2, shows a lower electrical resistivity than the materials Z1 and Z2. Furthermore, as clearly seen from Table 3 and FIG. 8, it is observed that when the electrical resistivity is lower, the electrode wear rate becomes lower, and that each of the materials A1 to A5, A8, and A9, which has a lower electrical resistivity than the materials Z1 and Z2, shows a lower electrode wear rate than the materials Z1 and Z2.

Experiment 4

Next, under the same conditions as shown in [Determination of Electrode Wear Rate] in Experiment 3 above, the above-mentioned cemented carbide material was machined using the materials (electrodes) A1 to A5, A8, A9, Z1, and Z2, and the machining speed of each of the materials was measured. Note that the term "machining speed" means a machined depth when the cemented carbide material was machined for 1 minute.

As the characteristics of the materials (electrodes) A1 to A5, A8, A9, Z1, and Z2 after the copper impregnation, the bulk density and the flexural strength of each of the electrodes (after the copper impregnation) were determined, in addition to the electrical resistivity and the copper impregnation rate obtained in Experiment 3 above. Then, the variable x of each of the materials (electrodes) A1 to A5, A8, A9, Z1, and Z2 was obtained from the bulk density, the copper impregnation rate, the electrical resistivity, and the flexural strength of the electrodes, using the following equation (2).

$$x=(d_B \times \varphi \times \rho/\sigma_B) \times 10 \quad (2)$$

In the above equation (2), $d_B$ is the bulk density (Mg/m$^3$) of the electrode, φ is the copper impregnation rate (%), ρ is the electrical resistivity (μΩm), and $\sigma_B$ is the flexural strength (MPa).

TABLE 3

| Material (Electrode) | Characteristics of substrate | | | | Characteristics after copper impregnation | | |
|---|---|---|---|---|---|---|---|
| | Bulk density [Mg/m$^3$] | Electrical resistivity [μΩm] | Open pore rate [Vol %] | Anisotropy ratio | Electrical resistivity [μΩm] | Copper impregnation rate [%] | Electrode wear rate [%] |
| A1 | 1.66 | 11.1 | 23.8 | 1.02 | 0.51 | 20.3 | 70.4 |
| A2 | 1.66 | 14.0 | 23.5 | 1.03 | 0.61 | 19.5 | 71.4 |
| A3 | 1.79 | 12.6 | 16.7 | 1.05 | 1.27 | 13.8 | 73.9 |
| A4 | 1.77 | 18.9 | 16.7 | 1.06 | 1.79 | 15.0 | 74.4 |
| A5 | 1.78 | 19.1 | 15.2 | 1.03 | 1.99 | 13.3 | 74.8 |
| A8 | 1.78 | 15.9 | 15.0 | 1.05 | 1.43 | 12.9 | 75.3 |
| A9 | 1.78 | 14.4 | 16.1 | 1.04 | 1.70 | 14.1 | 75.2 |
| Z1 | 1.88 | 8.7 | 10.7 | 1.03 | 2.63 | 8.6 | 80.9 |
| Z2 | 1.92 | 20.0 | 13.4 | 1.06 | 3.04 | 11.5 | 82.0 |

As clearly seen from Table 3 and FIG. 6, it is observed that when the open pore rate of the substrate is higher, the copper impregnation rate becomes higher, and that each of the materials A1 to A5, A8, and A9, which has a higher open pore rate of the substrate than the materials Z1 and Z2, shows a higher copper impregnation rate than the materials Z1 and Z2. Moreover, as clearly seen from Table 3 and FIG. 7, it is observed that when the copper impregnation rate is The flexural strength was measured by a three-point bending test at room temperature using an Instron-type material testing machine.

Figure 9:
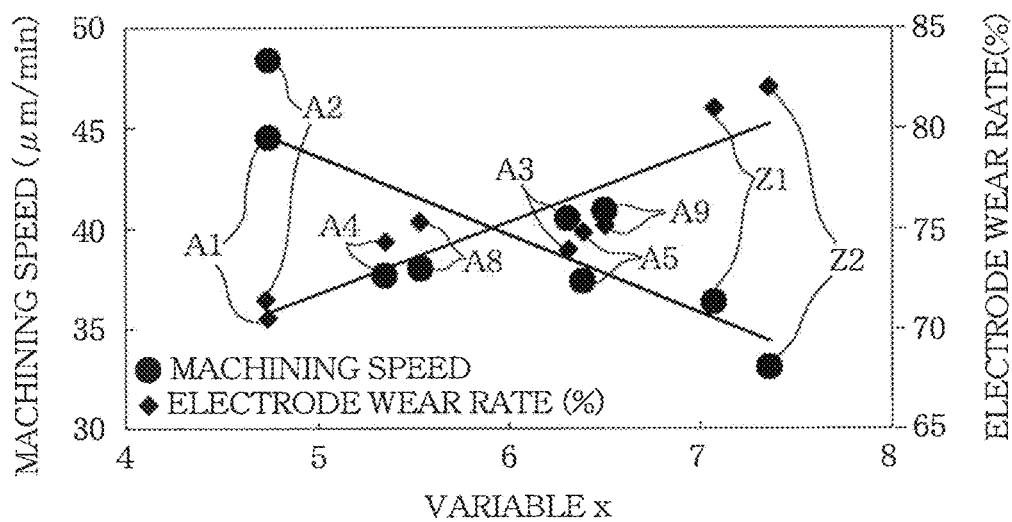
FIG. 9 is a graph illustrating the relationship of variable x with machining speed and electrode wear rate for materials A1 to A5, A8, A9, Z1, and Z2.

The characteristic values are shown in Table 4, and the relationship of the variable x with the machining speed and the electrode wear rate for each of the materials A1 to A5, A8, A9, Z1, and Z2 is shown in FIG. 9.

TABLE 4

| | Characteristics after copper impregnation | | | | | | |
|---|---|---|---|---|---|---|---|
| Material (Electrode) | Bulk density [Mg/m³] | Electrical resistivity [µΩm] | Flexural strength [MPa] | Copper impregnation rate [%] | Machining speed [µm/min] | Electrode wear rate [%] | Variable x |
| A1 | 3.48 | 0.51 | 76.0 | 20.3 | 44.5 | 70.4 | 4.73 |
| A2 | 3.41 | 0.61 | 86.3 | 19.5 | 48.4 | 71.4 | 4.71 |
| A3 | 3.02 | 1.27 | 84.2 | 13.8 | 40.5 | 73.9 | 6.30 |
| A4 | 3.12 | 1.79 | 156.7 | 15.0 | 37.7 | 74.4 | 5.35 |
| A5 | 2.97 | 1.99 | 123.2 | 13.3 | 37.4 | 74.8 | 6.38 |
| A8 | 2.94 | 1.43 | 98.1 | 12.9 | 38.1 | 75.3 | 5.53 |
| A9 | 3.04 | 1.70 | 112.1 | 14.1 | 40.8 | 75.2 | 6.50 |
| Z1 | 2.65 | 2.63 | 84.3 | 8.6 | 36.3 | 80.9 | 7.08 |
| Z2 | 2.95 | 3.04 | 140.0 | 11.5 | 33.0 | 82.0 | 7.37 |

As clearly seen from Table 4 and FIG. 9, the variable x was 6.5 or less for the materials (electrodes) A1 to A5, A8, and A9. This indicates that these materials can exhibit particularly good performance in both electrode wear rate and machining speed.

INDUSTRIAL APPLICABILITY

The present invention is applicable to an electrode for use in die-sinking by electrical discharge machining.

The invention claimed is:

1. A graphite-copper composite electrode material comprising:
a substrate; wherein the substrate comprises a graphite material and has pores; and copper, wherein the copper is impregnated in the pores of the substrate to thereby form the graphite-copper composite electrode material,
wherein the graphite-copper composite electrode material has an electrical resistivity of up to 2.5 µΩm;
wherein the substrate comprising the graphite material has an anisotropy ratio of 1.2 or less; and
wherein an impregnation rate φ of the copper in the graphite-copper composite electrode material is 13% or greater, the copper impregnation rate φ obtained by the following equation (1):

$$\varphi=[(d_B-d_{B,s})/\rho_{Cu}]\times 100, \quad (1)$$

wherein $d_B$ is a bulk density of the electrode material, $d_{B,s}$ is a bulk density of the substrate comprising the graphite material, and $\rho_{Cu}$ is the specific gravity of copper, which is $\rho_{Cu}$=8.96 Mg/m³.

2. The graphite-copper composite electrode material according to claim 1 having an electrical resistivity of 1.5 µΩm or less.

3. The graphite-copper composite electrode material according to claim 2 having an electrical resistivity of 1.0 µΩm or less.

4. The graphite-copper composite electrode material according to claim 1, wherein a variable x obtained by the following equation (2) is 7.5 or less:

$$x=(d_B\times\varphi\times\rho/\sigma_B)\times 10 \quad (2)$$

where $d_B$ is a bulk density (Mg/m³) of the electrode material, φ is a copper impregnation rate (%), ρ is an electrical resistivity (µΩm), and $\sigma_B$ is a flexural strength (MPa).

5. The graphite-copper composite electrode material according to claim 4, wherein the variable x obtained by the equation (2) is 6.5 or less.

6. The graphite-copper composite electrode material according to claim 1, wherein the substrate comprising the graphite material has a bulk density of from 1.40 Mg/m³ to 1.85 Mg/m³.

7. The graphite-copper composite electrode material according to claim 1, wherein the substrate comprising the graphite material has an open pore rate of 14 vol % or higher.

8. The graphite-copper composite electrode material according to claim 1, wherein the substrate comprising the graphite material has an electrical resistivity of from 8.9 µΩm to 19.5 µΩm.

9. The graphite-copper composite electrode material according to claim 1, wherein the impregnation of copper is performed by hot isostatic pressing (HIP).

10. An electrical discharge machining electrode, the electrical discharge machining electrode characterized by comprising a graphite-copper composite electrode material according to claim 1, wherein the electrical discharge machining electrode is for use in die-sinking a cemented carbide comprising tungsten carbide as a main component by electrical discharge machining.

11. An electrical discharge machining electrode, the electrical discharge machining electrode characterized by comprising a graphite-copper composite electrode material comprising a substrate; wherein the substrate comprises a graphite material and has pores; and copper, wherein the copper is impregnated in the pores of the substrate to thereby form the graphite-copper composite electrode material, wherein the graphite-copper composite electrode material has an electrical resistivity of up to 2.5 µΩm; and
wherein an impregnation rate φ of the copper in the graphite-copper composite electrode material is 13% or greater, the copper impregnation rate φ obtained by the following equation (1):

$$\varphi=[(d_B-d_{B,s})/\rho_{Cu}]\times 100, \quad (1)$$

wherein $d_B$ is a bulk density of the electrode material, $d_{B,s}$ is a bulk density of the substrate comprising the graphite material, and $\rho_{Cu}$ is the specific gravity of copper, which is $\rho_{Cu}$=8.96 Mg/m³; and
wherein the electrical discharge machining electrode is for use in die-sinking a cemented carbide comprising tungsten carbide as a main component by electrical discharge machining.

12. A graphite-copper composite electrode material comprising:
a substrate; wherein the substrate comprises a graphite material and has pores; and copper, wherein the copper is impregnated in the pores of the substrate to thereby form the graphite copper composite electrode material, wherein the graphite-copper composite electrode material has an electrical resistivity of up to 2.5 μΩm, and wherein a variable x obtained by the following equation (2) is 7.5 or less:

$$x=(d_B \times \varphi \times \rho/\sigma_B) \times 10 \qquad (2)$$

$d_B$ is a bulk density (Mg/m³) of the electrode material, φ is a copper impregnation rate (%), ρ is an electrical resistivity (μΩm), and $\sigma_B$ is a flexural strength (MPa).

13. An electrical discharge machining electrode, the electrical discharge machining electrode characterized by comprising a graphite-copper composite electrode material according to claim 12, wherein the electrical discharge machining electrode is for use in die-sinking a cemented carbide comprising tungsten carbide as a main component by electrical discharge machining.

14. The graphite-copper composite electrode material according to claim 12, wherein the substrate comprising the graphite material has an anisotropy ratio of 1.2 or less.

15. The graphite-copper composite electrode material according to claim 12, wherein an impregnation rate φ of the copper in the graphite-copper composite electrode material is 13% or greater, the copper impregnation rate φ obtained by the following equation (1):

$$\varphi=[(d_B - d_{B,s})/\rho_{Cu}] \times 100, \qquad (1)$$

wherein $d_B$ is a bulk density of the electrode material, $d_{B,s}$ is a bulk density of the substrate comprising the graphite material, and $\rho_{Cu}$ is the specific gravity of copper, which is $\rho_{Cu}=8.96$ Mg/m³.

16. The graphite-copper composite electrode material according to claim 12 having an electrical resistivity of 1.5 μΩm or less.

17. The graphite-copper composite electrode material according to claim 16 having an electrical resistivity of 1.0 μΩm or less.

18. The graphite-copper composite electrode material according to claim 12, wherein the substrate comprising the graphite material has a bulk density of from 1.40 Mg/m³ to 1.85 Mg/m³.

19. The graphite-copper composite electrode material according to claim 12, wherein the substrate comprising the graphite material has an open pore rate of 14 vol % or higher.

20. The graphite-copper composite electrode material according to claim 12, wherein the substrate comprising the graphite material has an electrical resistivity of from 8.9 μΩm to 19.5 μΩm.

* * * * *